United States Patent [19]
Baer

[11] 3,966,024
[45] June 29, 1976

[54] HELICAL SPRING CLUTCH

[75] Inventor: John S. Baer, Bar Harbor, Maine

[73] Assignee: Warner Electric Brake & Clutch Company, South Beloit, Ill.

[22] Filed: Jan. 23, 1975

[21] Appl. No.: 543,236

[52] U.S. Cl. .............................. 188/71.2; 188/82.3; 188/82.6; 192/12 BA
[51] Int. Cl.² .......................................... F16D 67/02
[58] Field of Search ............. 192/12 BA, 4 B, 12 A, 192/12 B; 188/71.2, 82.3, 82.6, 291

[56] References Cited
UNITED STATES PATENTS

| | | | |
|---|---|---|---|
| 2,475,432 | 7/1949 | Marihart | 192/12 BA |
| 2,738,863 | 3/1956 | Stelljes | 192/12 BA |
| 3,186,530 | 6/1965 | Petroff | 192/12 BA |
| 3,291,268 | 12/1966 | Nagel | 192/4 B |
| 3,581,853 | 1/1971 | Hoff | 192/12 BA |
| 3,637,056 | 1/1972 | Baer | 192/12 BA |
| 3,825,100 | 7/1974 | Freeman | 192/12 B |

Primary Examiner—Benjamin W. Wyche
Attorney, Agent, or Firm—Leydig, Voit, Osann, Mayer & Holt, Ltd.

[57] ABSTRACT

A disc brake retards the motion of the normally stationary output member of a helical spring clutch and serves to brake the rotary input member of the clutch to a gradual stop when a coiled helical spring is contracted to couple the output member to the input member.

4 Claims, 3 Drawing Figures

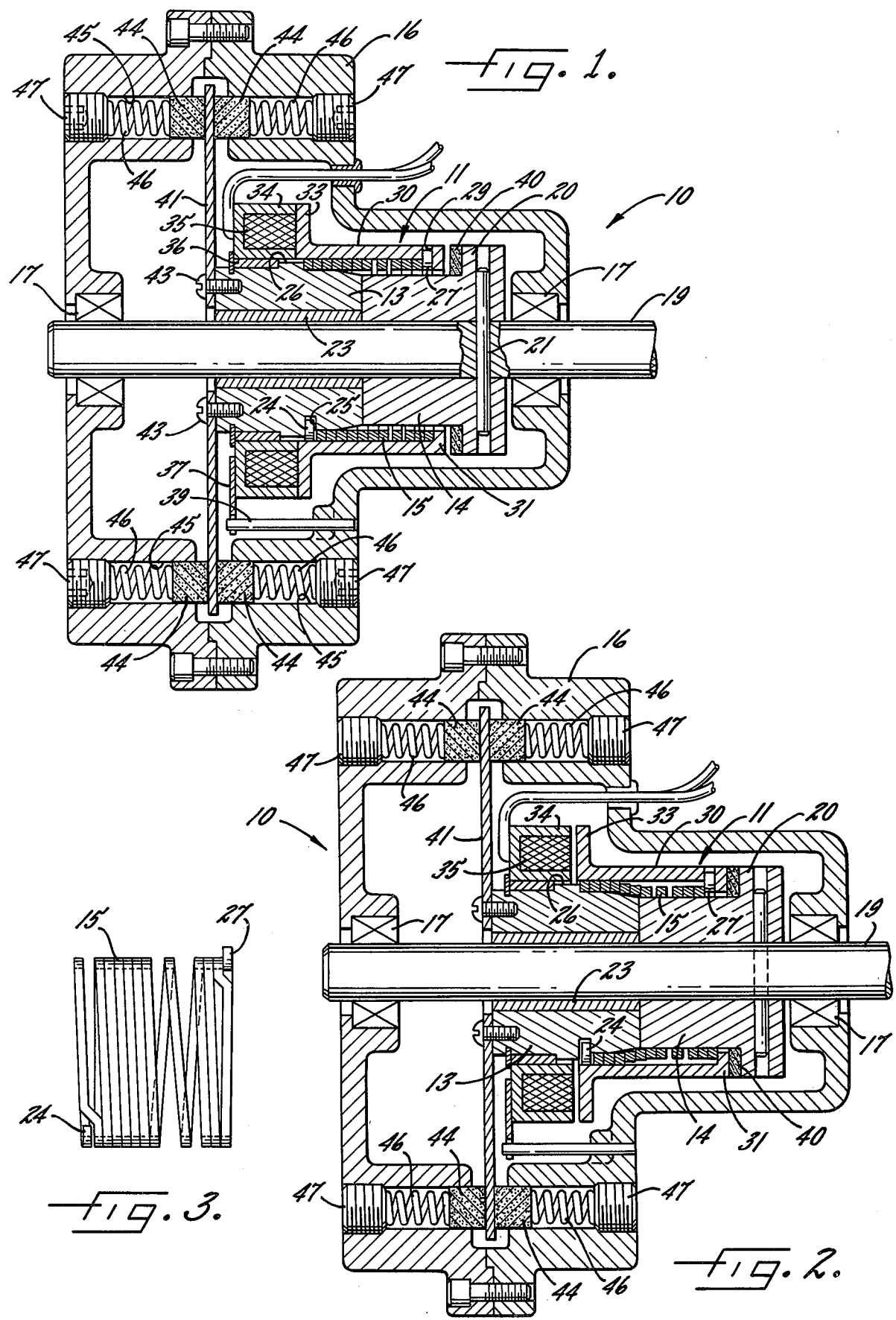

HELICAL SPRING CLUTCH

BACKGROUND OF THE INVENTION

This invention relates to a brake mechanism and, more particularly, to a brake mechanism of the type in which the braking action is produced in response to a coiled helical spring being actuated to couple a rotating member with a member adapted to stop the rotating member. Such a brake mechanism is shown in my U.S. Pat. No. 3,425,526.

SUMMARY OF THE INVENTION

The general aim of the present invention is to provide a new and improved helical spring brake mechanism which, when actuated, causes the rotating member to decelerate to a gradual stop rather than abruptly and positively locking the member against rotation and possibly damaging the member or a connected drive train.

A more detailed object is to provide a brake mechanism which includes a normally disengaged helical spring clutch having a driven input member and having a normally stationary output member whose motion is retarded by a friction brake. The brake mechanism is applied by actuating the spring to couple the input member to the output member and, by virtue of the output member being retarded by the friction brake, the input member is brought to a stop at a rate correlated with the frictional braking force exerted on the coupled output member.

The invention also resides in the provision of a unique brake mechanism having a helical spring clutch whose output member is retarded by a disk brake which may be adjusted to change the magnitude of the braking force.

These and other objects and advantages of the invention will become more apparent from the following detailed description when taken in conjunction with the accompanying drawings.

BRIEF DESCRIPTION OF THE DRAWINGS

FIG. 1 is a cross-sectional view taken longitudinally through a new and improved brake mechanism incorporating the unique features of the present invention, the braking mechanism being shown in a released condition.

FIG. 2 is a cross-sectional view similar to FIG. 1 but shows the braking mechanism in an applied condition.

FIG. 3 is a side elevational view of the helical spring which is incorporated in the braking mechanism.

DETAILED DESCRIPTION OF THE PREFERRED EMBODIMENT

The present invention contemplates the provision of a novel braking mechanism 10 having a helical spring clutch 11 with a normally stationary output member 13 which is frictionally retarded so as to bring a power-rotated clutch input member 14 to a comparatively non-abrupt stop when the braking mechanism is applied by actuating a coiled helical spring 15 to couple the input member with the output member. As a result of frictionally braking the output member, the input member may be stopped more gradually and with less shock than is the case with prior braking mechanisms of the type in which a helical spring couples the rotating member to a rigidly fixed member.

More specifically, the braking mechanism 10 comprises a two-part stationary housing 16 having bearings 17 which journal a power-rotated shaft 19 such as the stub shaft of an electric motor (not shown) adapted to be de-energized whenever the braking mechanism is applied. The clutch 11 is located within the housing and is generally similar to that disclosed in my U.S. Pat. 3,637,056. The input member 14 of the clutch if formed by a cylindrical hub telescoped over the shaft 19 and having a radially projecting flange 20. A pin 21 extends through the flange and the shaft to couple the input hub 14 for rotation with the shaft.

The normally stationary output member 13 of the clutch 11 comprises a cylindrical hub disposed end-to-end with the input hub 14 and journaled on the shaft 19 by a sleeve bearing 23. The helical spring 15 is telescoped over adjacent end portions of the hubs 13 and 14 and is normally relaxed or expanded in a radial direction so that its coils are located out of gripping engagement with the input hub as shown in FIG. 1. One end or tang 24 of the spring is anchored rigidly within a hole 25 in the output hub 13 while the adjacent end coil of the spring abuts against and is confined axially by an annular shoulder 26 projecting radially from the output hub.

At its opposite end, the spring 15 is formed with a second tang 27 which is fixed rigidly in a hole 29 in a clutch control element 30. Herein, the clutch control element is a normally stationary cylindrical collar which is telescoped over the spring and which is formed at one end with an inwardly projecting flange 31 for confining the end coil of the spring adjacent the tang 27. Formed on the other end of the collar 30 is a radially projecting flange 33 made of magnetic material and positioned in face-to-face relation with the pole faces of an annular magnet core 34 which houses an electromagnetic winding 35 adapted to be selectively energized and de-energized. The magnet core 34 is journaled relative to the output hub 13 by a sleeve bearing 36 and is held against rotation by a bracket 37 and a pin 39.

When the braking mechanism 10 is in a released condition, as shown in FIG. 1, the winding 35 is in an energized state and thus the flange 33 on the collar 30 is magnetically held in engagement with the pole faces of the magnet core 34. Like the coils of the spring disclosed in my aforementioned U.S. Pat. No. 3,637,056, some of the coils of the present spring 15 are axially separated when the spring is in a relaxed condition (see FIG. 3). When the winding 35 is first energized and attracts the flange 33, the collar 30 shifts to the left along the hubs 13 and 14 and compresses the separated coils so as to load the spring axially and cause the spring to bias the collar to the right. Accordingly, subsequent de-energization of the winding results in the collar 30 being shifted to the right by the spring as shown in FIG. 2. As an incident to such shifting, the flange 31 on the collar engages a ring 40 of friction material bonded rigidly to the flange 20 on the input hub 14. Engagement of the flange 31 with the friction ring 40 produces a clutching action between the two so as to cause the control collar 30 to rotate with the input hub 14. As the collar first rotates, it displaces the tang 27 angularly with respect to the tang 24 so as to cause the spring to contact and wrap downwardly upon the hubs 13 and 14 (see FIG. 2). The spring thus couples the output hub 13 to the input hub 14 for rotation in unison with the input hub.

In keeping with the invention, a frictional braking force is continuously imposed on the output hub 13 and thus the output hub serves to brake the input hub 14 whenever the two are coupled together by the spring 15. For this purpose, a circular disc 41 is secured rigidly to one end of the output hub by screws 43 and projects radially from the output hub. Disposed on each side of the disc is a series of angularly spaced braking pads 44 made of suitable friction material and pressed into frictional engagement with the disc so as to retard rotation of the disc and the attached output hub 13. The pads are slidably received within holes 45 in the housing 16 and are urged into engagement with the disc 41 by coil springs 46 which are telescoped into the holes. The springs seat against set screws 47 which are threaded in the holes 45 and which may be adjusted to change the pressure of the pads 44 against the disc 41 and thereby change the magnitude of the braking force.

With the foregoing arrangement, the brake mechanism 10 is released whenever the winding 35 is energized since the helical spring 15 is radially relaxed as shown in FIG. 1 and hence frees the input hub 14 for rotation relative to the output hub 13. Upon de-energization of the winding, the spring 15 expands axially to shift the flange 31 into clutching engagement with the friction ring 40. The collar 30 thus rotates with the input hub 14 to contract the spring 15 around the hubs and effect rotation of the output hub 13. Such rotation is resisted, however, by the friction brake formed by the pads 44 and thus the input hub 14 and the shaft 19 are braked to a controlled gradual stop at a rate correlated with the pressure exerted by the pads against the disc 41.

I claim as my invention:

1. A brake mechanism comprising a clutch having a normally rotatable input member and a normally stationary output member supported for relative rotation about a common axis, a coiled helical spring telescoped with said members and having one of its ends connected to said output member, a normally stationary collar telescoped with at least one of said members and connected to the other end of said spring, means for causing said collar to shift axially into and out of frictional engagement with said input member, said collar being rotated by said input member when in frictional engagement with said input member and being operable when rotated to cause said spring to flex radially and couple said output member for rotation with said input member, a disc rigid with and projecting radially from said output member, a brake comprising friction material located to rub against said disc and operable to frictionally retard rotation of said disc and said output member and thereby retard rotation of said input member when the latter is coupled to said output member by said spring, and resiliently yieldable means for pressing said friction material against said disc.

2. A brake mechanism as defined in claim 1 in which said friction material comprises a series of friction pads spaced angularly around and disposed in rubbing engagement with one face of said disc, said resilient means comprising springs associated with said pads for pressing the latter against said one face of said disc.

3. A brake mechanism as defined in claim 2 in which said brake further includes an additional series of friction pads spaced angularly around and disposed in engagement with the other face of said disc, and additional springs associated with said additional pads for pressing the latter against said other face of said disc.

4. A brake mechanism as defined in claim 2 further including means for selectively adjusting the pressure exerted by said pads on said disc.

* * * * *